(12) United States Patent
Turk et al.

(10) Patent No.: US 8,462,807 B2
(45) Date of Patent: Jun. 11, 2013

(54) TELECOMMUNICATIONS SYSTEMS

(75) Inventors: John Turk, Newbury (GB); Eric Murray, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 374 days.

(21) Appl. No.: 12/802,537

(22) Filed: Jun. 8, 2010

(65) Prior Publication Data

US 2011/0002221 A1   Jan. 6, 2011

(30) Foreign Application Priority Data

Jun. 8, 2009   (GB) .................................. 0909805.4
Apr. 1, 2010   (GB) .................................. 1005541.6

(51) Int. Cl.
*H04L 12/28*   (2006.01)

(52) U.S. Cl.
USPC ........................................................ 370/431

(58) Field of Classification Search
None
See application file for complete search history.

(56) References Cited

U.S. PATENT DOCUMENTS

| 5,796,722 | A | 8/1998 | Kotzin et al. | |
|---|---|---|---|---|
| 2003/0169725 | A1* | 9/2003 | Ahmavaara et al. | 370/352 |
| 2004/0057407 | A1* | 3/2004 | Balachandran et al. | 370/336 |
| 2004/0166835 | A1 | 8/2004 | Johansson et al. | |
| 2008/0057932 | A1 | 3/2008 | Brunner | |
| 2008/0081633 | A1 | 4/2008 | Oteri et al. | |
| 2008/0232326 | A1 | 9/2008 | Lindoff et al. | |
| 2010/0085884 | A1* | 4/2010 | Srinivasan et al. | 370/252 |

FOREIGN PATENT DOCUMENTS

| EP | 1 603 356 A2 | 12/2005 |
|---|---|---|
| EP | 1715715 A1 | 10/2006 |
| EP | 1895801 A1 | 3/2008 |
| EP | 2 043 376 A1 | 4/2009 |
| GB | 2 392 347 A | 2/2004 |
| WO | WO2008/031258 A1 | 3/2008 |
| WO | WO2008/050230 A2 | 5/2008 |
| WO | WO2009/038368 A1 | 3/2009 |
| WO | WO2009142562 A1 | 11/2009 |
| WO | WO2010039906 A1 | 4/2010 |
| WO | WO2010050899 A1 | 5/2010 |

* cited by examiner

*Primary Examiner* — Kevin C Harper
(74) *Attorney, Agent, or Firm* — Muirhead and Saturnelli, LLC

(57) ABSTRACT

A method of reducing the load on a first node in a cellular telecommunications network, which network includes a plurality of nodes, each of the nodes serving a plurality of telecommunications devices by providing communication resources thereto is disclosed. The method includes selecting a target telecommunications device for handover from the first node to a second of said nodes; handing over the target device to the second node; allocating communication resources to the target device to enable the second node to serve the target device; selecting a matched telecommunications device that is served by the first node; and adjusting the communication resources allocated to the matched device, which resources enable the first node to serve the matched device, so that they correspond to the resources allocated to the target device, which resources enable the second node to serve the target device.

18 Claims, 4 Drawing Sheets

TELECOMMUNICATIONS SYSTEMS

TECHNICAL FIELD

This application relates to telecommunications networks and, more particularly, but not exclusively, to balancing the load between network nodes of mobile or cellular telecommunications networks whilst reducing interference.

BACKGROUND OF THE INVENTION

In order to best utilise resources of cellular networks, it is beneficial for network operators to balance the traffic and signalling load between the cells. Once a particular cell has used up its resources at a particular time, that cell becomes congested and is unable to manage communications with any further mobile devices (UEs).

Methods for load balancing between cells are well known. U.S. Pat. No. 5,796,722 (Motorola), which is incorporated herein by reference, describes a method in which the effects of congestion are managed by monitoring the activity on different carriers and, when a carrier becomes congested, handing over call traffic from that carrier to a different carrier.

The objective of load balancing is to maximise system capacity by distributing traffic from congested cells to more lightly loaded cells. By handing over a UE to a more lightly loaded cell, it is hoped that the Quality of Service (QoS) experienced by that UE will improve, even though it is not now connected its preferred cell, due to the increased resources that can now be allocated to that UE.

However, although network performance can be improved by load balancing handovers of UEs between cells, such handovers will result in UEs no longer being connected to the optimum cell (i.e. that with the lowest pathloss to the UE). When a UE is not connected to the optimum cell, excess uplink (UL) and downlink (DL) interference to neighbouring cells can be caused by the need to transmit additional power in order to overcome the higher pathloss. The heavily loaded cell will have few or no idle radio resources available, so it would be advantageous to allocate resources which minimise interference to users remaining on the original cell.

SUMMARY OF THE INVENTION

According to a first aspect of the system described herein, there is provided a method of reducing the load on a first node in a cellular telecommunications network, which network includes a plurality of nodes, each of the nodes serving a plurality of telecommunications devices by providing communication resources thereto, the method including:
  selecting a target telecommunications device for handover from the first node to the second of said nodes;
  handing over the target device to the second node;
  allocating communication resources to the target device to enable the second node to serve the target device;
  selecting a matched telecommunications device that is served by the first node; and
  adjusting the communication resources allocated to the matched device (which resources enable the first node to serve the matched device) so that they correspond to the resources allocated to the target device (which resources enable the second node to serve the target device).

In the embodiments to be described, the target telecommunications device is selected as the device that has only a slight preference to being served by the first node over the second node, whereas the matched device has a high preference to being served by the first node over the second node. The "preference" for a node may be determined, for example, by measuring the downlink power from that node as received at the target or matched device. Typically, the target device will be located near the edge of the area served by the first node, whereas the matched device will be close to the first node itself (and away from the edge of the area served by the first node). The first node and the second node will therefore be a significant distance apart.

Typically in telecommunications networks, to provide sufficient capacity, communication resources must be used more than once in the network. Depending on the type of network, these resources might be resources in the time and frequency domain. In the embodiment, these resources are resource blocks in the time and frequency domain of an LTE cellular telecommunications network. Communication resources showing the same physical attributes (e.g. time and frequency) are an example of corresponding resources (referred to above). If corresponding resources are used by nodes or devices in close proximity to one another, interference will occur. According to an embodiment of the system described herein, by allocating corresponding resources to the target device and the matched device (which devices are selected in the manner discussed above so that they will generally be a significant distance apart), interference will be minimal (due to the device spacing). In this way, a process for performing load balancing between nodes is advantageously combined in an efficient way with an arrangement for allocating resources between the devices which allows re-use of corresponding resources in a way that minimises interference.

It should be understood that the steps specified in the method above do not necessarily have to be performed in the order in which they are listed. For example, the step of handing over the target device to the second node could be performed after the step of adjusting the communication resources. By way of further example, the step of selecting a matched device that is served by the first node could be performed before the step of allocating communication resources to the target device.

In the first embodiment to be described, the following steps are performed for each of the devices served by the first node. For each device (hereinafter a "first device") a value, R(UEx, eNB a), indicative of the quality of the radio path between the first device and the first node is recorded. Also, for the first device, a value, R(UEx, eNB cn), is recorded that is indicative of the quality of the radio path between the first device and the second node. For another one of the devices served by the first node (hereinafter a "second device") a value R(UEy, eNB a), is recorded that is indicative of the quality of the radio path between the second device and the first node. Also, for that second device, a value, R(UEy, eNB cn), is recorded that is indicative of the quality of the radio path between the second device and the second node). The sum of R(UEx, eNB a) and R(UEy, eNB cn) is then calculated. The sum R(UEy, eNB a) and R(UEx, eNB cn) is also calculated. A score for the device pair comprising the first device and the second device, that is the difference between these two sums, is then recorded. This score can be expressed as:

R(UEx, eNB a)–R(UEy, eNB a)–R(UEx, eNB cn)+
    R(UEy, eNB cn)

Next, a step is performed to select, from all the devices served by the first node, the pair that has the highest score. Of this pair, the first device is made the matched device, and the second device is made the target device.

Embodiments of the system described herein provide a method of reducing the effect of the excess interference when a UE is handed over to a neighbouring cell for load balancing purposes, based on matching the resources allocated to that UE to those allocated to one or more UEs that remain in the overloaded cell. Embodiments of the system described herein provide a method of selecting which UEs should be handed over based on uplink and/or downlink (DL) Reference Signal Receive Power (RSRP) and/or uplink (UL) and/or downlink (DL) Signal to Interference plus Noise Ratio (SINR). "SINR" refers to estimating SINR by separately measuring signal and interference power and computing the ratio, or by any other method. SINR can be estimated indirectly from measurements other than power.

In particular, embodiments identify target UEs for handover which are then allocated the same network resource as matched UEs in the original cell.

The embodiments to be described provide a method for load balancing in mobile communication networks, and, in particular, to load balancing by allocating the same network resource to selected UEs in neighbouring cells.

The system described herein also provides a cellular telecommunications network and a computer readable medium storing executable code that performs the described methods.

BRIEF DESCRIPTION OF THE DRAWINGS

For a better understanding of the system described herein, embodiments will now be described by way of example with reference to the accompanying drawings in which.

In the drawings like elements are generally designated with the same reference sign.

DETAILED DESCRIPTION OF VARIOUS EMBODIMENTS

Figure 1:
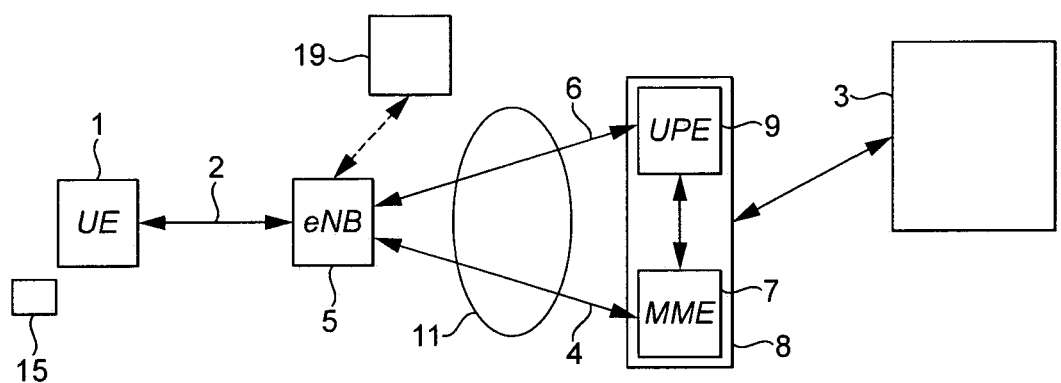
FIG. 1 shows the elements of an SAE/LTE 4G network.

FIG. 1 shows schematically the logical elements of a SAE/LTE ("4G") cellular telecommunications network. Mobile terminal (UE) 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises a base station or eNodeB (or eNB) 5. An eNB 5 performs functions generally similar to those performed by the NodeB and the radio network controller (RNC) of a 3G network. In practice there will be a multiplicity of eNBs 5, each serving a particular area or "cells". Each eNB is coupled to an antenna device. The eNB and antenna device form a cell site. The cell site provides radio coverage to a plurality of cells, e.g. three. Typically, the cell site will only provide radio coverage for a portion of each of the cells. Other portions of each of the cells are provided with radio coverage and by other cell sites.

Signalling in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

A mobility management entity (MME) 7 provides equivalent functions to the control plane functions of the SGSN and GGSN from the 3G architecture (Release-6). The MME handles security key management. The MME also provides control plane function for mobility between LTE and GSM/UNITS networks. Communications between the eNB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3G RNC and the user plane part of the 3G GGSN. Communications between the eNB 5 are transmitted to the UPE 7 via the S1-u Interface 6. The known 3GPP authentication procedure may be re-used in the SAE/LTE architecture shown, between the terminal 1/UE and the MME 7.

It should be noted that, although in FIG. 1 the MME 7 and UPE 9 are shown as separate logical entities they may exist as a single physical node of the telecommunications network in gateway aGW 8.

Data are transmitted between the eNB 5 and the MME 7 and UPE 9 via IP transport network 11.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated by a SIM 15.

In LTE data are transmitted in the downlink -DL- (i.e. in the direction from eNB to mobile terminal) by orthogonal frequency division multiple access (OFDMA). According to OFDMA the available frequency spectrum is divided into several sub-carriers. To maximise spectral efficiency, the frequency responses of the sub-carriers are overlapping and orthogonal. The OFDMA downlink transmissions and the uplink -UL- transmissions (i.e. transmission from a mobile terminal to an eNB) are organised into frames of 10 ms duration. This frame structure is applicable to frequency division duplex (FDD)—the use of frequency-division multiplexing to separate outward and return signals—and time division duplex (TDD)—the use of time-division multiplexing to separate outward and return signals.

Figure 2:
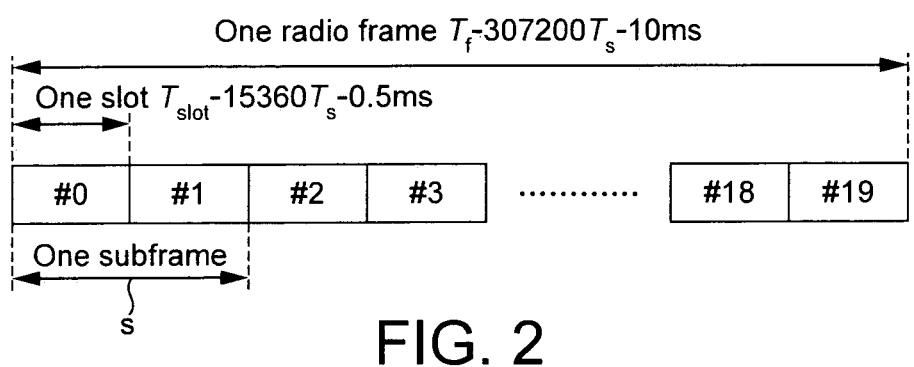
FIG. 2 shows the structure of an LTE FDD frame structure (Type 1)

As shown in FIG. 2, each frame consists of 20 slots (#0,#1 . . . , #19) of 0.5 ms. A sub-frame S is defined as two consecutive slots. For FDD, for a particular frame, 10 sub-frames are available for downlink transmission and 10 sub-frames are available for uplink transmission. The uplink and downlink transmissions are separated in the frequency domain. For TDD, a sub-frame is either allocated to downlink or uplink transmission. However, the first and sixth sub-frame are always allocated for downlink transmission.

Figure 3:
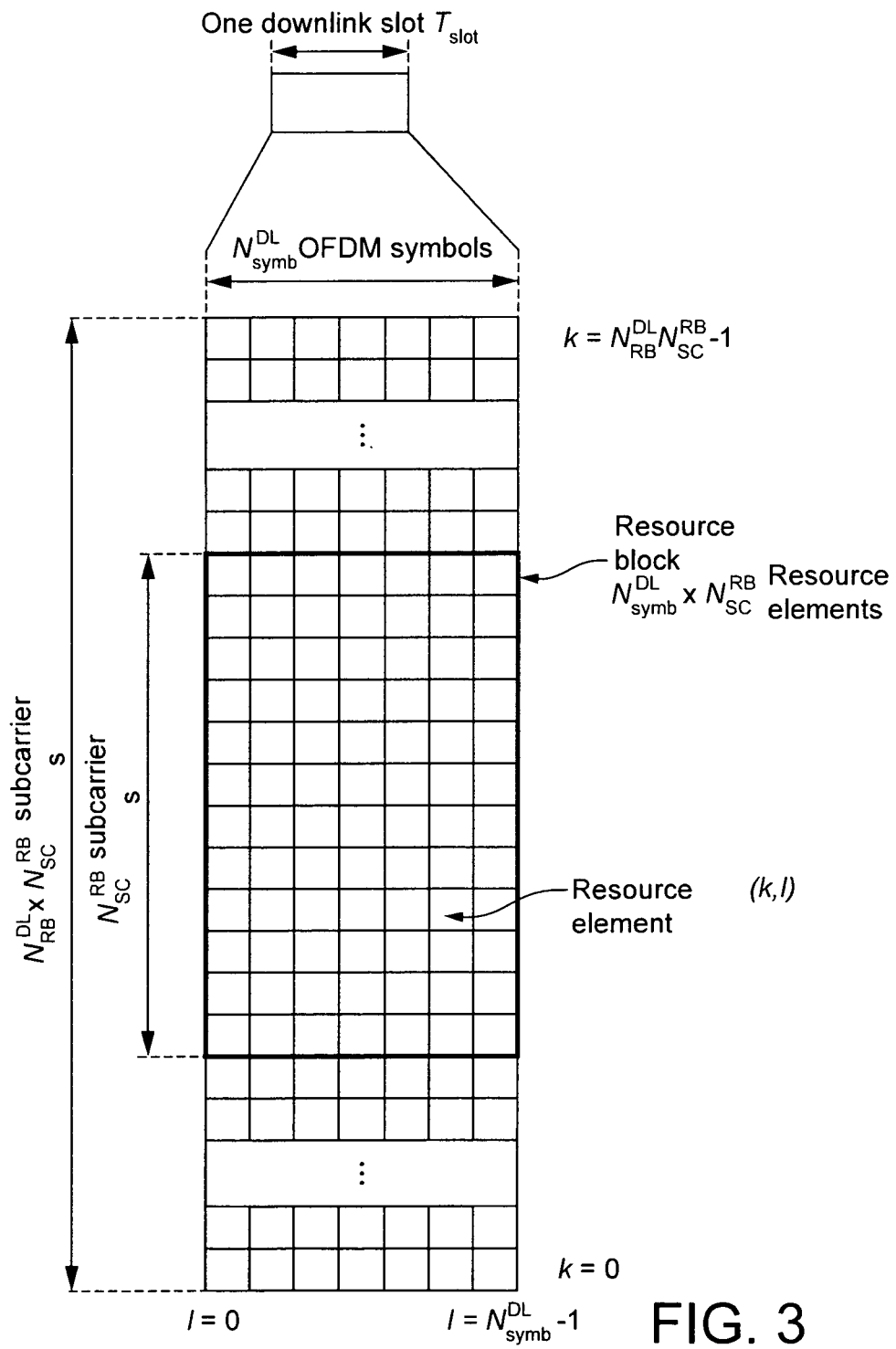
FIG. 3 shows in detail the structure of a downlink slot in LTE for normal cyclic prefix.

As shown in FIG. 3, the FDD downlink signal of each slot can be defined by a resource grid of a predetermined number of sub-carriers (according to the bandwidth available) and a predetermined number of OFDMA symbols. There are twelve consecutive sub-carriers in the frequency domain in FIG. 3.

Data are allocated to UEs in resource blocks, which in FIG. 3 consist of 12 consecutive sub-carriers in the frequency domain and 7 consecutive OFDM symbols in the time domain. A resource block consists of 12×7 resource elements.

In LTE interference will generally occur when mobile terminals in proximity to one another are scheduled on the same resource blocks (i.e. they use the same time and frequency resources). The amount of interference depends upon the distance between the mobile terminals and the power of the respective transmissions.

Each eNB transmits a reference signal (RS) in the downlink that is unique within that particular cell, and therefore allows the cell to be identified and which are used by the mobile terminals for channel estimation and physical measurements (such as signal strength—e.g. RSRP—and signal to noise ratio, average path loss and signal-to-interference ratio) collectively referred to as channel quality. The channel quality information is used, for example, to make handover and cell reselection decisions (described further below). In LTE the downlink reference signal is modulated into reference signals embedded within the resource blocks.

The measurements represented in the resource blocks are transmitted in the uplink back to the eNBs from the mobile terminals.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals (e.g. RSRP) of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

As briefly mentioned above, sometimes a handover of a mobile terminal is performed from one cell to another cell for load balancing purposes, rather than because of signal strength/channel quality changes.

Figure 4:
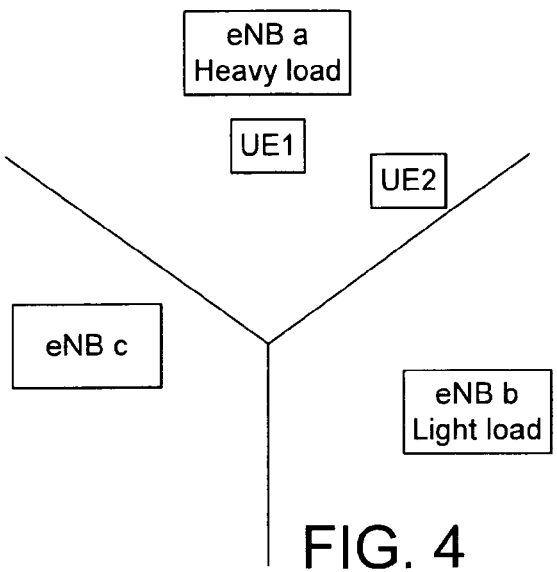
FIG. 4 shows a plan view of a plurality of neighbouring cells.

FIG. 4 shows three cells located at a single cell site. The cells are LTE cells served by respective eNBs (eNB a, eNB b and eNB c). eNB a carries a heavy load, including acting as serving eNB for UE1 and UE2. eNB b carries a light load.

As part of LTE Specifications, each UE is required to measure the Reference Signal Receive Power (RSRP). RSRP is a measurement (in dBm) made by the UE of a reference signal transmitted from an eNB. A higher RSRP value indicates a higher received signal power, and thus a lower pathloss to the eNB. UEs measure RSRP values for the serving eNB (i.e. the eNB on which they are currently camped) and neighbouring eNBs.

The RSRP values measured by each UE may be transmitted to its serving eNB. For the UEs served by eNB a in FIG. 4, the RSRP values may be stored as follows (where R(UE $\alpha$, eNB $\beta$) is the RSRP value measured by UE $\alpha$ of eNB $\beta$:

| UE served by eNB a | RSRP values stored |
|---|---|
| UE1 | R(UE1, eNB a), R(UE1, eNB b, R(UE1, eNB c), . . . R(UE1, eNB o) |
| UE2 | R(UE2, eNB a), R(UE2, eNB b, R(UE2, eNB c), . . . R(UE2, eNB o) |
| . . . | . . . |
| UEn | R(UEn, eNB a), R(UEn, eNB b, R(UEn, eNB c), . . . R(UEn, eNB o) |

Not all UEs will have the same neighbour eNBs.

According to embodiments of the system described herein, the RSRP values of eNBs are used to select a UE suitable for a load balancing handover from a serving eNB to a neighbouring eNB, such a UE that is a candidate for handover being referred to as a "target UE". According to an important feature of the embodiment, the measured RSRP values are also used to select one or more corresponding UEs that remain served by the serving eNB. These UEs are referred to as "matched UEs". How the matched UEs are selected and the purpose thereof will be described in more detail below.

The RSRP value for a particular eNB, as measured by UE, is generally inversely proportional to the distance of that UE from the eNB. That is, a UE close to the eNB will have a relatively high RSRP value, and a UE further from the eNB will have a relatively low RSRP value. As will be known to those skilled in the art, the RSRP value is not solely proportional to distance, but will also be affected by other factors, such as obstructions to the radio signal path between the UE and the eNB.

By way of example, considering the arrangement of UE1 and UE2 in relation to eNB a and eNB b of FIG. 4, it can be seen that UE1 and eNB a are closer to each other than any other UE/eNB combination. Therefore, the RSRP value for the UE1 and eNB a might be measured as a relatively high value, 4. This could be expressed as:

R(UE1,eNB a)=4 where UE1 is the identifier of the UE1, and eNB a is the identifier of the eNB a, and R is the RSRP value measured by UE1 of eNB a.

The UE/eNB pair with the greatest distance therebetween is UE1 and eNB b. The RSRP value for this pair will be relatively low, for example:

R(UE1, eNB b)=1

A UE, like UE1, that has a high RSRP value for its serving cell (eNB a) and a relatively low RSRP value for its neighbouring cell (eNB b) or cells is a UE that is clearly best served by eNB a, rather than any of its neighbouring cells. It can be considered that UE1 has a high "preference" to be served by eNB a.

In contrast, although UE2 is served by eNB a, the UE2 is only slightly closer to the serving eNB a than its neighbouring eNB b. The example RSRP values measured by UE2 for eNB a and eNB b, in the FIG. 4 example, might be:

R(UE2,eNB a)=3

R(UE2,eNB b)=2

The RSRP value measured by UE2 from its serving eNB, eNB a, is higher than that measured from neighbouring eNB, eNB b; however, the difference in RSRP values is relatively small—indicating that the UE2 has only a small "preference" to be served by eNB a, rather than eNB b.

If it is determined that eNB a is overloaded, and that the number of UEs served thereby should be reduced for load balancing purposes, the best candidate for such a handover is a UE that (relative to all the UEs served by the eNB a) has a low RSRP value measured for eNB a, in combination with (relative to all the UEs served by the eNB a) a high RSRP value measured for eNB b.

As indicated above, according to the present embodiment of the system described herein, in addition to identifying a UE that has a low preference for its serving eNB (a target UE), it is also desirable to identify a corresponding UE that has a high preference for its serving eNB (a matched UE).

For the set of n UEs served by eNB a each permutation of two UEs ("UE pair") from the set is identified. The number of permutations will be:

$$\frac{n!}{(n-2)!}$$

One UE (UE x) of the pair is a potential matched UE, and the other UE (UEy) of the pair is a potential target UE. For each UE pair (UEx,UEy) the neighbour eNBs that they have in common are identified. This is done by consulting the RSRP measurements stored in the eNB to identify each neighbour eNB of each UE (which is recorded with the relevant RSRP value as shown in the table above).

For each common neighbour eNB (eNB cn) of each UE pair (UE x,UEy) the following score is calculated:

R(UEx, eNB a)−R(UEy, eNB a)−R(UEx, eNB cn)+R(UEy, eNB cn)−calculation A.

This is referred to as the pair scoring step. The pair of UEs with the highest score is the pair containing the best matched UE (UEx) and the best target UE (UEy) of the UEs served by the serving eNB,eNB a. In the FIG. 4 arrangement, the target UE (UEy) would be UE2, and the matched UE (UEx) would be UE1.

The resource requirements for each potential target UE (UEy) and each potential matched UE (UEx) are then estimated or determined. The resource requirement in this embodiment is a total number of resource blocks required to provide the data rate needed by the UE. This will depend on the type of communication. Streaming video will require a much higher data rate than sending plain text, for example. If the potential target UE requires more resource blocks than the potential matched UE, then a group of potential matched UEs is selected from UEs served by eNB a such that the total resource block requirement of the group of potential matched UEs equals or exceeds the resource block requirement of the potential target UE. All members of the group of potential matched UEs are UEs that have a neighbour eNB (eNB cn) in common with each other that is also a neighbour cell of the potential target UE. The score for each member of the group is then calculated using calculation A. The score for the group of potential matched UEs (for a given potential target UE) is the average (arithmetical mean) of the respective scores calculated using calculation A, with UEy as the target UE and the different ones of the group of potential matched UEs as the matched UEx in each calculated score. This is referred to as the resource quantity evaluation step.

Figure 5A:
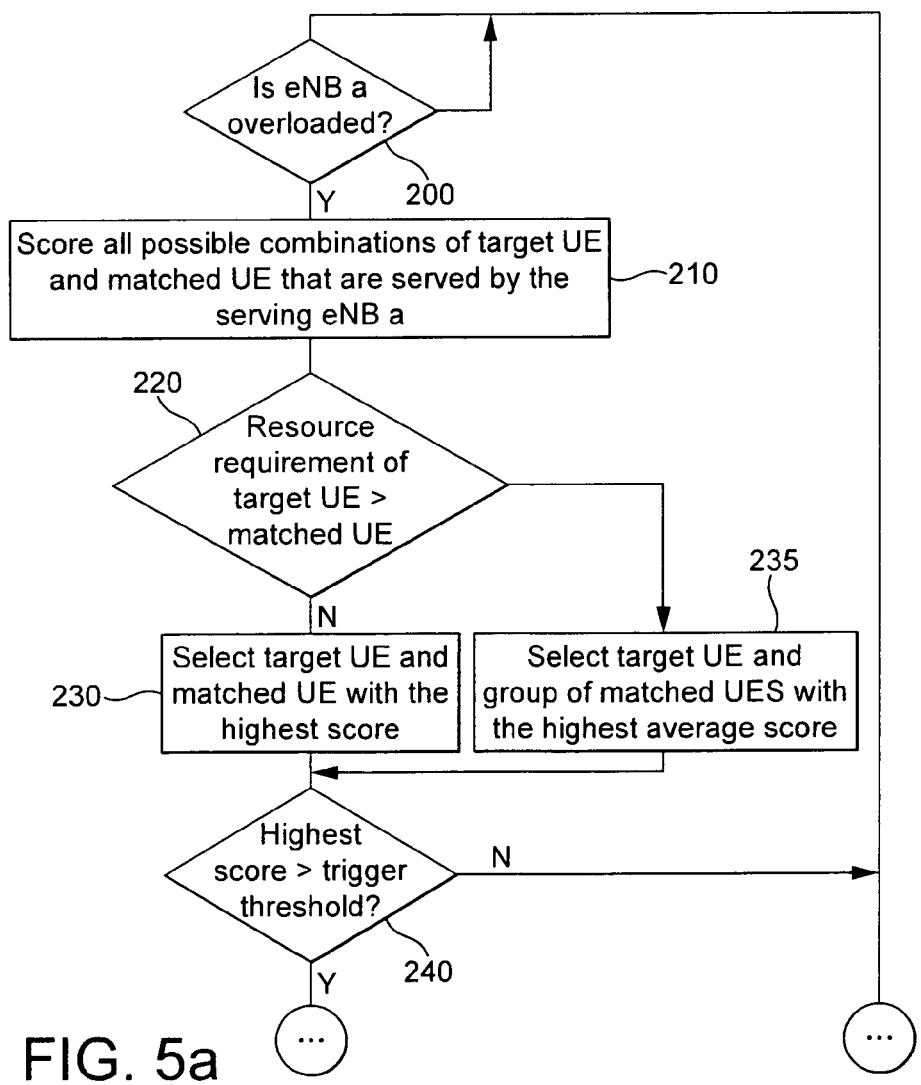
FIGS. 5a and 5b are a flow diagram showing the steps taken when identifying UEs for handover and managing the handover.
Figure 5B:
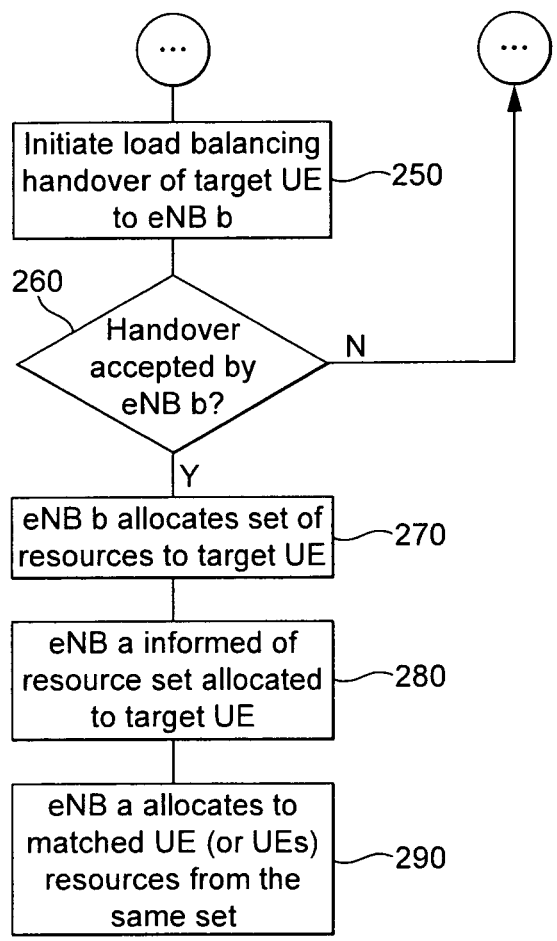

Referring now to FIG. 5, the procedure for initiating a load balancing handover is triggered by the serving eNB (eNBa) at step 200 when eNBa is in an overloaded state. For example, the eNB may consider itself to be in an overloaded state if its admission control algorithm would reject attack attempts from additional UEs, or if the currently served/affiliated UEs are not meeting their QoS targets. The existence of an overloaded state may be determined in other ways.

The algorithm to determine the best UE for a load balancing handover proceeds as follows:

At step 210, the pair scoring step is performed. Scores are computed for all possible combinations of potential target and potential matched UEs that are served by the serving eNB, eNB a. Thus, a score is calculated according to calculation A for every possible neighbour cell of eNB a, and for every possible (UEx,UEy) pair, where both UEx and UEy are currently served by eNB a, and UEx≠UEy. At this stage, only pairs of UEs are considered (one being the potential target UE and the other being the potential matched UE). When a UE affiliated to the serving eNB is unable to report an RSRP value for a given neighbouring eNB, perhaps because the UE cannot hear that eNB, then the RSRP value is estimated by the algorithm to be the RSRP value reported by the UE for the serving eNB, plus a specified offset value. By definition, an RSRP value will always be available for the serving eNB.

At step 220 the resource quantity evaluation step is performed. The resource requirements of the target UE and the matched UEs are compared.

If the resource requirements of the potential target UE are less than or equal to those of the potential matched UE, at step 230, the potentially matched UE (UEx) and target UE (UEy) pair that had the highest score calculated in step 210 are selected as the matched UE/UEs and the target UE.

If the resource requirements of the target UE are greater than the resource requirements of the matched UE, at step 235, the resource quantity evaluation step is performed to select a group of potentially matched UEs for the target UE, which group has the highest average score.

At step 240 it is determined whether the highest score (or highest average score) is greater than a trigger threshold. The trigger threshold may be preset, or may be adapted according to an algorithm to determine the optimum trigger threshold value at any given time. Determining whether the highest score (or average score) is greater than the trigger threshold may be useful, for example, to prevent handover of a UE from the serving eNB a when there is no target UE that has only a slight preference to eNB a as a serving eNB over the relevant neighbouring eNB, eNB b. This would be reflected in a higher R(UEy,eNB a) value and a lower R(UEy,eNB b) value, and also a lower score. The trigger threshold prevents handover in circumstances where there is no real suitable target UE. Handing over of a target UE in such circumstances may cause an unacceptable amount of interference, and it may be preferable for the serving eNB, eNB a, to continue operating in an overloaded state, rather than to perform handover in such circumstances.

If, at step 240, the highest score (or average score) is less than or equal to the trigger threshold, the algorithm represented by the flow chart in FIG. 5 restarts, with step 200 being performed again. If the highest score is greater than the trigger threshold, then the next step 250 is performed.

At the next step, step 250, the serving eNB a initiates a load balancing handover of the target UE to the neighbouring eNB b.

At step 260, it is determined whether the handover of target UE is accepted by the neighbouring eNB b. If the handover is not accepted by the neighbouring eNB b, the algorithm represented by FIG. 5 is returned to step 200. For a period of time that neighbouring eNB b may be marked with a flag, so that the algorithm excludes that neighbouring eNB b as a possible neighbouring eNB to which a target UE may be handed over until the flag is no longer present. Scores using calculation A will, during this time period, not include RSRP values calculated by UEs for that neighbouring eNB. This will prevent that neighbouring eNB b receiving frequent requests for handovers that it cannot accept (for example, because it is itself overloaded). Alternatively, or additionally, for a period of time that target UE may be marked with a flag, so that the algorithm excludes that target UE as a possible target UE which may be handed over until the flag is no longer present. Scores using calculation A will, during this time period, not include RSRP values calculated by that target UE. This will prevent frequent handover attempts of that target UE that might not be accepted.

If the handover is accepted by eNB b, then, at step 270, the neighbour eNB b allocates a set of communication resources to the target UE. The resource set may be physical resource blocks. The neighbour eNB b will allocate resources independently to the target UE in both the uplink and the downlink.

At step 280, the serving eNB a is made aware of the resource set allocated to the target UE. This may be achieved by a number of mechanisms—for example, explicit signalling between the eNB b and the eNB a or by the use of a predetermined algorithm for allocated resources used by all eNBs (so that the eNB a would be able to calculate what resources were allocated by eNB b by making an independent calculation but using the same algorithm as eNB b).

At step 290, the eNB a is aware of the resource set that has been allocated by eNB b to the target UE. The eNB a then allocates to the matched UE resources from the same set as allocated by eNB b to target UE. Again, resource matching is done separately for both the uplink and the downlink because the eNB a allocates resources independently to the matched UE1 in both the uplink and downlink. The matched UE and target UE will therefore use the same resource blocks in the time and frequency domain.

If there is a group of matched UEs, resources will be allocated to the matched UEs, according to their resource requirement, in order of their scores computed in 210. Each matched UE in the group will be allocated different resources (at a different time/frequency) to avoid interference. The size of the matched set of resources can increase or decrease to match the increase or decrease of the target UEs resource block allocation. If the size of the set of resources decreases, then the number of matched UEs in the group may be reduced, by removing UEs from the group. The UEs are removed in sequence according to the score (as defined in step 210), with the UEs having the lowest score being removed first. Should the serving eNB have any idle resource blocks in a given sub-frame, the serving eNB should preferentially match any idle resource blocks that it may have to resource blocks being used by the target UE, since idle resources will be unaffected by interference. This will then reduce the size of the set of active resources that the serving eNB needs to match to those in use by the target UE. In the best case, the resources used by the target UE can be completely matched to a set of idle resource blocks, and the serving eNB will then be unaffected by interference from the target UE. However, since the serving eNB is considered to be overloaded, it is not expected that there will be many idle resource blocks with which to do such matching.

The algorithm then returns to step 200 to determine whether the load on the serving eNB is such that further load balancing handovers are necessary.

It is preferred that the scores and physical resource requirements are recalculated periodically, for example every 20 ms, as these values will change over time.

The resource quantity evaluation step 220 (and step 235) may be omitted, although this is disadvantageous if the target UE and matched UEs have significantly different resource requirement.

In the embodiment described above the target UEy and the matched UEx (or group of matched UEs) are selected according to calculation A so that the target and matched UE pair are scored simultaneously. As an alternative, the target UEy may be selected as a first step before any calculations are performed to identify a matched UE (or group of matched UEs). In this embodiment the target UEy is chosen as that UE which maximises the following score when evaluated over the set of all UEs affiliated to the serving eNBa, and the set of all known neighbouring cells, eNB cn:

R(UEy,eNB cn)−R(UEy, eNB a)−calculation B

Calculation B scores all the potential target UEs. Calculation B will tend to yield a negative number because the RSRP measurement between a UE and its serving eNB will generally be higher than the RSRP value measured between the UE and a neighbour eNB. The UE which has a score from calculation B that is the highest value is the best target eNB. The "highest value" is the value closest to zero in the event that all the scores from calculation B yield a negative result, or is the greatest positive value if calculation B does in fact yield any positive results.

When the target UE has been selected by performing calculation B, the matched UE (or group of matched UEs) may be chosen as the UE which maximises the following score over the set of all UEs affiliated to the serving eNBa (except the selected target UE), and the set of common neighbouring cells to the neighbouring cells of target UE:

R(UEx,eNBa)−R(UEx,eNBcn)−calculation C

The UE with the highest score yielded by calculation C is selected as the matched UE.

As indicated above, resources may be allocated to a matched UE independently in both the uplink and the downlink. It is additionally possible to match a UE to a target UE in the uplink that is different from the UE matched to the target UE in the downlink.

Calculation C can be used if the same UEs are matched in the uplink and the downlink. In an alternative arrangement now to be described, the matched UEs are matched separately in the uplink and the downlink.

The sets of matched UEs are constructed by ranking the UEs affiliated to the serving eNB a (excluding the chosen target UE) according to a computed score. This score shall be computed differently for the uplink and downlink. The score shall be constructed from a mix of RSRP measurements and SINR (signal to interference plus noise) estimates.

SINR values can be estimated by a number of means. On the downlink, it is proposed to use RSRQ measurements reported by the UE. Alternatively, CQI reports could be used, with a suitable mapping defined to convert CQI to SINR. On the uplink, the eNB can use proprietary algorithms to estimate SINR. Such algorithms are anyway required to estimate SINR for the purposes of other algorithms, such as uplink scheduling and power control.

On the uplink, UEs will be ranked according to the following score, which shall be evaluated for all UEs affiliated to the serving eNB, excluding the UE chosen to be the target UE:

$$\text{Uplink Score} = \frac{\left(1 + \dfrac{(1 + SINR(UEy, eNBcn))}{\dfrac{1}{SINR(UEx, eNBa)} + \dfrac{R(UEy, eNBa)}{R(UExeNBa)}}\right)}{(1 + SINR(UEx, eNBa))}$$

where:
R(UE y, eNB a) is the RSRP value reported by the target UE for the serving eNB a
R(UE x, eNB a) is the RSRP value reported by the candidate matched UE for the serving eNB a
SINR(UE x, eNB a) is the signal to interference plus noise ratio experienced on the uplink from the candidate matched UE x at the serving eNB a
SINR(UE y, eNB cn) is the signal to interference plus noise ratio experienced on the uplink from the target UE y at the target eNB cn The matched UE in the uplink is the matched UE with the highest Uplink Score. If a group of UEs are matched to a target UE, then that group will comprise the UEs with the highest scores.

On the downlink, UEs will be ranked according to the following score, which shall be evaluated for all UEs affiliated to the serving eNB, excluding the UE chosen to be the target UE:

$$\text{Downlink Score} = \frac{\left(1 + \dfrac{\dfrac{R(UEy, eNBcn)}{R(UEy, eNBa)}}{1 + SINR(eNBa, UEy)}\right)}{(1 + SINR(eNBa, UEx))}$$

(with inner term $1 + \dfrac{1}{\dfrac{1}{SINR(eNBa, UEx)} + \dfrac{R(UEx, eNBcn)}{R(UEx, eNBa)}}$)

where
R(UE y, eNB a) is the RSRP value reported by the target UE for the serving eNB a
R(UE y, eNB cn) is the RSRP value reported by the target UE for the target eNB cn
R(UE x, eNB a) is the RSRP value reported by the candidate matched UE for the serving eNB a
R(UE x, eNB cn) is the RSRP value reported by the candidate matched UE for the serving eNB cn
SINR(eNB a, UE y) is the signal to interference plus noise ratio experienced on the downlink from the serving eNB a to the target UE y
SINR(eNB a, UE x) is the signal to interference plus noise ratio experienced on the downlink from the serving eNB a to the candidate matched UE y The UE matched in the downlink to the target UE is the UE with the highest Downlink Score. If a group of UEs are matched to the target UE, then that group will comprise UEs with the highest downlink scores.

If there is a group of matched UEs for a single target UE, it is possible for some matched UEs to be matched to a target UE in both the uplink and the downlink and some matched UEs to be only matched in one of the uplink or downlink.

Advantageously, the load balancing handover shall only be triggered if both the Uplink Score and Downlink Score exceed a defined threshold. This threshold may be different for the uplink and downlink. The thresholds may be set manually, or determined automatically and dynamically by a self-optimising algorithm.

In the embodiments described, the eNB a and eNB b (and also eNB c) are eNBs co-located at a single cell site. Such cell sites may include a scheduler which manages the resource of all eNBs at that cell site. The scheduler computes the scores for the pairs or sets of UEs and manages cell handover and resource allocation. The embodiment is particularly advantageous to handovers between eNBs served by a single cell site because the scheduler handles the intelligence and decision making. However, the system described herein is applicable to inter cell site handovers, in which UEs are matched and targeted between eNBs from different cell sites. However, in such embodiments, no single scheduler would handle that handover and resource allocation, and hence there would be an increase in signalling on the network as these measurements and instructions are signalled between schedulers. This increase of signalling load can be reduced if implicit rather than explicit signalling of the matched resources is used. That is, if resourced allocation is determined by a predetermined algorithm used by all eNBs.

The embodiments described are applied to an LTE cellular telecommunications network. However, embodiments of the system described herein may be implemented on different radio access networks, such as GSM and UMTS. However, the system described herein may be particularly advantageous when applied to LTE networks because LTE enables resources to be allocated in the time and frequency domains.

It is inevitable that some UEs will be allocated the same resource blocks if the spectrum available is to be used at all intensively. However, it is desirable for UEs in close proximity to one another not to use the same resource blocks as this results in increased interference.

Interference will occur whenever two UEs in proximity to one another are allocated resources on the same resource block (that is, they are allocated the same time and frequency resources). Various complicated arrangements have been proposed to control the allocation of resource blocks to UEs to reduce interference. The system described herein provides a relatively simple mechanism for reducing interference caused by allocating UEs served by different eNBs the same resource blocks.

The present embodiments select a target UE for handover from its serving eNB a to a neighbouring eNB b which has only a slight preference for the serving eNB a, as determined by the measured RSRP values. Such a UE will generally be located near the edge of the cell served by the eNB a. In the embodiment, by selecting a matched UE that has a high preference for being served by serving eNB a, a matched UE will be identified that is likely to be close to the eNB a and therefore a substantial distance from the cell edge. Because the matched UE1 and the target UE2 are a significant distance apart (typically, a distance equivalent to the cell size), these UEs can be allocated the same resource blocks without causing an unacceptable amount of interference. The power control arrangement in LTE will be such that the power used for transmission between the eNB a and the UE1 is relatively low, due to the proximity of the eNB and the UE1. Due to the greater distance between the eNB b and the target UE2, the LTE power control algorithm will cause a higher transmit power between the eNB b and the target UE2. However, when the same resource blocks are used for transmissions between the eNB a and the matched UE1, and the eNB b and the target UE2, little indifference will occur.

By selecting a target UE as a candidate for a load balancing handover from a serving eNB a to a neighbouring eNB b, and also making this UE one of a pair of target and matched UEs for resource sharing, an efficient algorithm for resource sharing is provided.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware and/or other devices. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of reducing a load on a first node in a cellular telecommunications network, which network includes a plurality of nodes, each of the nodes serving a plurality of telecommunications devices by providing communication resources thereto, the method comprising:
    selecting a target telecommunications device for handover from the first node to a second of said nodes;
    handing over the target device to the second node;
    allocating communication resources to the target device to enable the second node to serve the target device;
    selecting a matched telecommunications device that is served by the first node; and
    adjusting communication resources allocated to the matched device, the communication resources allocated to the matched device enabling the first node to serve the matched device, wherein the communication resources allocated to the matched device correspond to the communication resources allocated to the target device, the communication resources allocated to the target device enabling the second node to serve the target device, wherein the target device is selected in dependence upon a quality of a radio path between the target device and the first node and a radio path between the target device and the second node, and wherein at least one of the following is further provided:
    (i) the target device that is selected maximises the score:

R(UEy,eNB cn)−R(UEy, eNB a)

where R(UEy,eNB cn) is indicative of the quality of the radio path between the target device and the second node and R(UEy,eNBa) is indicative of the quality of the radio path between the target device and the first node;
    (ii) the matched device is selected from those devices served by the first node as a one of those devices for which the quality of the radio path between the matched device and the first node is better than the quality of the radio path between the target device and the first node; or
    (iii) the target device is selected from those devices served by the first node as a one of those devices for which the quality of the radio path between the target device and the second node is better than the quality of the radio path between the matched device and the second node.

2. The method of claim 1, wherein the communication resources include resources in the time domain.

3. The method of claim 2, wherein the communication resources allocated to the matched device correspond to the communication resources allocated to the target device in the time domain.

4. The method of claim 1, wherein the communication resources include resources in the frequency domain.

5. The method of claim 4, wherein the communication resources allocated to the matched device correspond to the communication resources allocated to the target device in the frequency domain.

6. The method of claim 1, wherein the quality is at least one of: a downlink power measurement, an uplink power measurement, a downlink signal to noise ratio, and an uplink signal to noise ratio.

7. The method of claim 1, wherein each of the nodes comprises a base station that serves a cell of the cellular network.

8. The method of claim 1, wherein the cellular network comprises an LTE network and each of the nodes comprises an eNB.

9. The method of claim 8, wherein the communication resources include resource blocks.

10. A method of reducing a load on a first node in a cellular telecommunications network, which network includes a plurality of nodes, each of the nodes serving a plurality of telecommunications devices by providing communication resources thereto, the method comprising:
    selecting a target telecommunications device for handover from the first node to a second of said nodes;
    handing over the target device to the second node;
    allocating communication resources to the target device to enable the second node to serve the target device;

selecting a matched telecommunications device that is served by the first node; and adjusting communication resources allocated to the matched device, the communication resources allocated to the matched device enabling the first node to serve the matched device, wherein the communication resources allocated to the matched device correspond to the communication resources allocated to the target device, the communication resources allocated to the target device enabling the second node to serve the target device, wherein the matched device is selected in dependence upon a quality of a radio path between the matched device and the first node and a radio path between the matched device and the second node.

11. The method of claim 10, wherein the matched device is selected in dependence upon the quality of the radio path between the matched device and the first node and a radio path between the matched device and the second node in the uplink.

12. The method of claim 10, wherein the matched device is selected in dependence upon the quality of the radio path between the matched device and the first node and a radio path between the matched device and the second node in the downlink.

13. A cellular telecommunications network including a plurality of nodes, each of the nodes serving a plurality of telecommunications devices by providing communication resources thereto, the network comprising:

a load reducer that reduces a load on a first of said nodes, the load reducer including:
  a first selecting device that selects a target telecommunications device for handover from the first node to a second of said nodes;
  a hand-over device that hands over the target device to the second node;
  an allocation device that allocates communication resources to the target device to enable the second node to serve the target device;
  a second selecting device that selects a matched telecommunications device that is served by the first node; and
  an adjusting device that adjusts communication resources allocated to the matched device, the communication resources allocated to the matched device enabling the first node to serve the matched device, and wherein the communication resources allocated to the matched device correspond to the communication resources allocated to the target device, the communication resources allocated to the target device enabling the second node to serve the target device, wherein the target device is selected in dependence upon a quality of a radio path between the target device and the first node and a radio path between the target device and the second node, and, wherein at least one of the following is further provided:

(i) the target device that is selected maximises the score:

R(UEy,eNB cn)−R(UEy, eNB a)

where R(UEy,eNB cn) is indicative of the quality of the radio path between the target device and the second node and R(UEy,eNBa) is indicative of the quality of the radio path between the target device and the first node;

(ii) the matched device is selected from those devices served by the first node as a one of those devices for which the quality of the radio path between the matched device and the first node is better than the quality of the radio path between the target device and the first node; or (iii) the target device is selected from those devices served by the first node as a one of those devices for which the quality of the radio path between the target device and the second node is better than the quality of the radio path between the matched device and the second node.

14. A method of reducing a load on a first node in a cellular telecommunications network, which network includes a plurality of nodes, each of the nodes serving a plurality of telecommunications devices by providing communication resources thereto, the method comprising:

selecting a target telecommunications device for handover from the first node to a second of said nodes;

handing over the target device to the second node;

allocating communication resources to the target device to enable the second node to serve the target device;

selecting a matched telecommunications device that is served by the first node; and adjusting communication resources allocated to the matched device, the communication resources allocated to the matched device enabling the first node to serve the matched device, wherein the communication resources allocated to the matched device correspond to the communication resources allocated to the target device, the communication resources allocated to the target device enabling the second node to serve the target device, wherein the target device is selected in dependence upon a quality of a radio path between the target device and the first node and a radio path between the target device and the second node;

for at least one first device served by the first node, excluding the selected target device:
  recording a value, R(UEx, eNB a), indicative of the quality of the radio path between the first device and the first node on the downlink,
  recording a value, R(UEx,eNB en), indicative of the quality of the radio path between the first device and the second node on the downlink,
  recording a value R(UEy,eNB a), indicative of the quality of the radio path between at least one second device and the first node on the downlink, and
  recording a value, R(UEy,eNB en), indicative of the quality of the radio path between the second device and the second node on the downlink,
  recording a value, SINR(UEx, eNB a), indicative of the quality of the radio path between the first device and the first node on the uplink,
  recording a value, SINR(eNB a, UEx), indicative of the quality of the radio path between the first device and the first node on the downlink,
  recording a value, SINR(UEy, eNB en), indicative of the quality of the radio path between the second device and the second node on the uplink,
  recording a value, SINR(eNB a, UEy), indicative of the quality of the radio path between the second device and the first node on the downlink,
  using the values R(UEx, eNB a), R(UEy, eNB a), SINR(UEx, eNB a), SINR(UEy, eNB en) and to produce an Uplink Score,
  using the values R(UEx, eNB a), R(UEx, eNB en), R(UEy, eNB a), R(UEy, eNB en), SINR(eNB a, UEx), and SINR(eNB a, UEy) to produce a Downlink Score; and
  recording for each device the Uplink Score and the Downlink Score;

selecting from all the devices served by the first node a device that has the highest Uplink Score and making that device the matched device in the uplink; and selecting from all the devices served by the first node a device that has the highest Downlink Score and making that device the matched device in the downlink.

15. The method of claim 14, wherein the selected target device is handed over to the second node only if the Uplink Score exceeds a specified uplink trigger threshold and the Downlink Score exceeds a specified downlink trigger threshold.

16. A non-transitory computer readable medium storing computer software that reduces a load on a first node in a cellular telecommunications network, which network includes a plurality of nodes, each of the nodes serving a plurality of telecommunications devices by providing communication resources thereto, the computer software comprising:
   executable code that selects a target telecommunications device for handover from the first node to a second of said nodes;
   executable code that hands over the target device to the second node;
   executable code that allocates communication resources to the target device to enable the second node to serve the target device;
   executable code that selects a matched telecommunications device that is served by the first node; and
   executable code that adjusts communication resources allocated to the matched device, the communication resources allocated to the matched device enabling the first node to serve the matched device, and wherein the communication resources allocated to the matched device correspond to the communication resources allocated to the target device, the communication resources allocated to the target device enabling the second node to serve the target device, wherein the target device is selected in dependence upon a quality of a radio path between the target device and the first node and a radio path between the target device and the second node, and, wherein at least one of the following is further provided:
   (i) the target device that is selected maximises the score:

$$R(UEy, eNB\ cn) - R(UEy, eNB\ a)$$

where $R\ (UEy, eNB\ cn)$ is indicative of the quality of the radio path between the target device and the second node and $R\ (UEy, eNBa)$ is indicative of the quality of the radio path between the target device and the first node;
   (ii) the matched device is selected from those devices served by the first node as a one of those devices for which the quality of the radio path between the matched device and the first node is better than the quality of the radio path between the target device and the first node; or
   (iii) the target device is selected from those devices served by the first node as a one of those devices for which the quality of the radio path between the target device and the second node is better than the quality of the radio path between the matched device and the second node.

17. A cellular telecommunications network including a plurality of nodes, each of the nodes serving a plurality of telecommunications devices by providing communication resources thereto, the network comprising:
   a load reducer that reduces a load on a first of said nodes, the load reducer including:
      a first selecting device that selects a target telecommunications device for handover from the first node to a second of said nodes;
      a hand-over device that hands over the target device to the second node;
      an allocation device that allocates communication resources to the target device to enable the second node to serve the target device;
      a second selecting device that selects a matched telecommunications device that is served by the first node; and
      an adjusting device that adjusts communication resources allocated to the matched device, the communication resources allocated to the matched device enabling the first node to serve the matched device, and wherein the communication resources allocated to the matched device correspond to the communication resources allocated to the target device, the communication resources allocated to the target device enabling the second node to serve the target device, wherein the matched device is selected in dependence upon a quality of a radio path between the matched device and the first node and a radio path between the matched device and the second node.

18. A non-transitory computer readable medium storing computer software that reduces a load on a first node in a cellular telecommunications network, which network includes a plurality of nodes, each of the nodes serving a plurality of telecommunications devices by providing communication resources thereto, the computer software comprising:
   executable code that selects a target telecommunications device for handover from the first node to a second of said nodes;
   executable code that hands over the target device to the second node;
   executable code that allocates communication resources to the target device to enable the second node to serve the target device;
   executable code that selects a matched telecommunications device that is served by the first node; and
   executable code that adjusts communication resources allocated to the matched device, the communication resources allocated to the matched device enabling the first node to serve the matched device, and wherein the communication resources allocated to the matched device correspond to the communication resources allocated to the target device, the communication resources allocated to the target device enabling the second node to serve the target device, wherein the matched device is selected in dependence upon a quality of a radio path between the matched device and the first node and a radio path between the matched device and the second node.

* * * * *